(12) United States Patent
Minder et al.

(10) Patent No.: US 8,993,660 B2
(45) Date of Patent: Mar. 31, 2015

(54) ANTISTATIC THERMOPLASTIC COMPOSITIONS

(75) Inventors: Ernst Minder, Sissach (CH); Heinz Herbst, Lörrach (DE); Cecile Gibon, Mannheim (DE)

(73) Assignee: BASF SE, Ludwigshafen (DE)

( * ) Notice: Subject to any disclaimer, the term of this patent is extended or adjusted under 35 U.S.C. 154(b) by 187 days.

(21) Appl. No.: 13/513,212

(22) PCT Filed: Dec. 6, 2010

(86) PCT No.: PCT/EP2010/068965
§ 371 (c)(1),
(2), (4) Date: Jul. 23, 2012

(87) PCT Pub. No.: WO2011/069960
PCT Pub. Date: Jun. 16, 2011

(65) Prior Publication Data
US 2012/0283367 A1 Nov. 8, 2012

(30) Foreign Application Priority Data
Dec. 10, 2009 (EP) .................................. 09178684

(51) Int. Cl.
*C08K 5/41* (2006.01)
*C08K 5/55* (2006.01)
*C08L 23/12* (2006.01)
*C08K 5/19* (2006.01)
*A43B 7/36* (2006.01)
*C08K 5/00* (2006.01)
*C08K 5/3415* (2006.01)
*C08L 101/00* (2006.01)
*C08L 23/06* (2006.01)
*C08L 77/02* (2006.01)

(52) U.S. Cl.
CPC ... *C08K 5/19* (2013.01); *A43B 7/36* (2013.01); *C08K 5/0075* (2013.01); *C08K 5/3415* (2013.01); *C08L 101/00* (2013.01); *C08L 23/06* (2013.01); *C08L 77/02* (2013.01); *C08L 2201/04* (2013.01)
USPC ......................................................... 524/106

(58) Field of Classification Search
CPC ............ C08K 5/41; C08K 5/55; C08L 26/06; C08L 23/12
USPC ......................................................... 524/106
See application file for complete search history.

(56) References Cited

U.S. PATENT DOCUMENTS

| 5,604,284 | A | 2/1997 | Ueda et al. |
| 5,652,326 | A | 7/1997 | Ueda et al. |
| 5,886,098 | A | 3/1999 | Ueda et al. |
| 5,965,206 | A * | 10/1999 | Hilti et al. ................... 427/393.1 |
| 2006/0100323 | A1 * | 5/2006 | Schmidt et al. ............... 524/106 |
| 2009/0300946 | A1 | 12/2009 | Egbers et al. |
| 2012/0088867 | A1 | 4/2012 | Brand |

FOREIGN PATENT DOCUMENTS

| JP | 2009-197117 A | 9/2009 |
| JP | 2009-292944 A | 12/2009 |
| WO | 2007/090755 A1 | 8/2007 |

OTHER PUBLICATIONS

Plastics Additives Handbook, editors R. Gachter et al., 3rd edition (1990) pp. 749-775.

* cited by examiner

*Primary Examiner* — Kelechi Egwim
(74) *Attorney, Agent, or Firm* — Oblon, McClelland, Maier & Neustadt, L.L.P.

(57) ABSTRACT

The instant invention pertains to the use of an antistatic composition comprising a polar thermoplastic polymer and an ionic liquid as antistatic additive for non-polar thermo-plastic or elastomeric polymers. Further aspects of the invention are a process for the preparation of an antistatic non-polar thermoplastic or elastomeric polymer which process comprises incorporating therein a mixture of a polar thermoplastic polymer and an ionic liquid and the composition of a polar thermoplastic polymer, an ionic liquid and a non-polar thermoplastic or elastomeric polymer.

22 Claims, No Drawings

ANTISTATIC THERMOPLASTIC COMPOSITIONS

The instant invention pertains to the use of an antistatic composition comprising a polar thermoplastic polymer and an ionic liquid as antistatic additive for non-polar thermoplastic or elastomeric polymers. Further aspects of the invention are a process for the preparation of an antistatic non-polar thermoplastic or elastomeric polymer which process comprises incorporating therein a mixture of a polar thermoplastic polymer and an ionic liquid and the composition of a polar thermoplastic polymer, an ionic liquid and a non-polar thermoplastic or elastomeric polymer.

It is known that polymers are subject to a strong electrostatic charge and that charges, once applied, can be discharged only slowly because of the low electrical conductivity of polymers. Rapid discharging is required not only for aesthetic reasons but also, in many cases, for reasons of safety. The following adverse effects in use may be mentioned: soiling of polymer surfaces, electrical shocks to persons touching polymers, disruption of production caused by the adhesion of film webs, destruction of electronic components, lump formation in polymer powders, and sparking, caused by charges being too high, with subsequent ignition, which has already frequently resulted in serious explosions.

It is also known to limit static charging by the addition of additives that improve surface conductivity, but such substances have the disadvantage of being ineffective in practice when atmospheric humidity is low. It is therefore better to use additives that are effective at low atmospheric humidity, which can usually be achieved by increasing the volume conductivity. The known substances for increasing volume conductivity, for example carbon black or metal powder, however, alter the mechanical properties of the polymers and cannot be used for transparent or natural colored polymers. In addition, there is an increasing requirement for additives to be ecologically unobjectionable.

Further details relating to antistatic additives and the mechanism of static charging may be found, for example, in the "Plastics Additives Handbook", editors R. Gächter and H. Müller, Hanser Verlag, 3rd edition, 1990, pages 749-775.

U.S. Pat. Nos. 5,604,284, 5,652,326 and 5,886,098 disclose antistatic thermoplastic resin compositions comprising a certain polyetheresteramide additive.

U.S. Pat. No. 5,965,206 discloses compositions comprising thermoplastic or elastomeric polymer substrates and an antistatic mixture in the form of contiguous fibers. A component of the antistatic fibers may be, for example, polyetheresteramides.

WO 2007/090755 discloses antistatic polyurethanes containing an ionic liquid. However, the document is silent as to the use of, for example, such a polyurethane as an antistatic additive for non-polar thermoplastic or elastomeric polymers. The direct use of ionic liquids in non-polar thermoplastic polymers causes severe problems since compatibility of ionic substances in non-polar thermoplastic polymers is very limited, leading to exudation of the polar substance. Only very small amounts of ionic substances can be incorporated which do not render the polymer sufficiently antistatic.

Surprisingly it has now been found that non-polar polymer substrates are made more efficiently antistatic by using a composition of a polar thermoplastic polymer and an ionic liquid. Such a composition is very effective. Even at low ionic liquid concentrations sufficiently conductive polymers are obtained without any noticeable exudation.

One aspect of the invention is the use of a composition comprising
a) a polar thermoplastic polymer; and
b) an organic ionic liquid where the ionic liquid is selected from the group consisting of
methyltri-(1-butyl)ammonium, 2-hydroxyethylammonium, 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butyl-imidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethyl-imidazolium, 1-(1-hexyl)-2,3-dimethyl-imidazolium, 1-(1-octyl)-2,3-dimethyl-imidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium or 1,4,5-trimethyl-3-octylimidazolium;
as cation and
chloride, bromide, hydrogensulfate, tetrachloroaluminate, thiocyanate, methylsulfate, ethylsulfate, methanesulfonate, formate, acetate, dimethylphosphate, diethylphosphate, p-toluenesulfonate, tetrafluoroborate or hexafluorophosphate;
as anion;
as antistatic additive for non-polar thermoplastic or elastomeric polymers.

Polar thermoplastic polymers in the context of the present invention are polymers with a water absorption of >1% in 24 hours at 23° C. according to ISO 62.

Examples of polar thermoplastic polymers are, for example, polymers derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and the copolymers thereof.

Homo- and co-polymers of cyclic ethers, such as polyalkylene glycols, polyethylene oxide, polypropylene oxide or copolymers thereof with bisglycidyl ethers.

Polyacetals, such as polyoxymethylene, and also those polyoxymethylenes which contain comonomers such as, for example, ethylene oxide; polyacetals that are modified with thermoplastic polyurethanes, acrylates or MBS.

Polyphenylene oxides and sulfides.

Polyurethanes derived from polyethers, polyesters and polybutadienes having terminal hydroxy groups on the one hand and aliphatic or aromatic polyisocyanates on the other hand.

Polyamides and copolyamides derived from diamines and dicarboxylic acids and/or from aminocarboxylic acids or the corresponding lactams, such as polyamide 4, polyamide 6, polyamide 6,6, aromatic polyamides derived from m-xylene, diamine and adipic acid; polyamides prepared from hexamethylenediamine and iso- and/or terephthalic acid and optionally an elastomer as modifier, for example poly-2,4,4-trimethylhexamethyleneterephthalamide or poly-m-phenyleneisophthalamide. Block copolymers of the above-mentioned polyamides with polyolefins, olefin copolymers, ionomers or chemically bonded or grafted elastomers; or with polyethers, such as, for example, with polyethylene glycol, polypropylene glycol or polytetramethylene glycol. Also polyamides or copolyamides modified with EPDM or ABS; and polyamides condensed during processing ("RIM polyamide systems").

Ionomers, which are, for example, commercially available under the trade name Surlyn® from Dupont Inc.

Polyureas, polyimides, polyamide imides and polybenzimidazoles.

Polyesters derived from dicarboxylic acids such as terephthalic acid, isophthalic acid, naphthalene dicarbonic acid and mixtures thereof; and dialcohols such as ethylene glycol, diethylene glycol, triethylene glycol, propylene glycol, butylene glycol, cycloohaxane dimethanole and mixtures therof; and/or from hydroxycarboxylic acids or the corresponding lactones, such as polyethylene terephthalate, polypropylene terephthalate, polybutylene terephthalate, poly-1,4-dimethylolcyclohexane terephthalate, polyhydroxybenzoates, and also block polyether esters derived from polyethers with hydroxy terminal groups; and also polyesters modified with polycarbonates or MBS.

Polycarbonates and polyester carbonates.

Polysulfones, polyether sulfones and polyether ketones.

Polyvinylpyrrolidone and Copolymer Thereof

For example the polar thermoplastic polymer is selected from the group consisting of ionomer, polyethylene glycol modified copolyester, polybutyleneterephthalate, copolyester elastomers, polyamide 6, polyamide 6.6, polyether-block-amide, polyetherester, polyetheramide, polyetheresteramide, polyoxymethylene, thermoplastic polyurethane, polyphenylene oxide, and polyvinylpyrolidone.

Preferably the polar thermoplastic polymer is selected from the group consisting of ionomer, polyethylene glycol modified polyethyleneterephthalate, copolyester elastomers, polyether-block-amide, polyetheresteramide, polyetherester, polyetheramide, thermoplastic polyurethane and polyvinylpyrrolidone.

In particular the polar thermoplastic thermoplastic polymer is selected from the group consisting of ionomer, polyethylene glycol modified polyethyleneterephthalate, polyamide, copolyester elastomers, polyetheresteramide, and thermoplastic polyurethane.

The term ionic liquid refers to salts (compounds of cations and anions) which at atmospheric pressure (1 bar) have a melting point of less than 180° C., preferably less than 150° C., particularly preferably less than 100° C. and very particularly preferably less than 80° C.

In a further preferred embodiment, the ionic liquids have a melting point in the range from 50° C. to 150° C., in particular in the range from −20° C. to 120° C.

In a particularly preferred embodiment, the ionic liquids are liquid under normal conditions (1 bar, 21° C.), i.e. at room temperature.

The ionic liquids of the instant invention comprise exclusively organic compounds as cations.

Suitable organic cations are, in particular, organic compounds having heteroatoms such as nitrogen, sulfur or phosphorus, particularly preferably organic compounds having at least one, preferably precisely one, cationic group selected from among ammonium groups (ammonium groups of an aromatic ring system or quaternary ammonium groups), oxonium groups, sulfonium groups and phosphonium groups.

The anion can be an organic or inorganic anion, preferably an inorganic anion. The ionic liquids of the instant invention consist exclusively of the salt of an organic cation with one of the anions mentioned below, particularly preferably an inorganic anion.

The molecular weight of the ionic liquids is preferably less than 2000 g/mol, particularly preferably less than 1500 g/mol, particularly preferably less than 1000 g/mol and very particularly preferably less than 750 g/mol; in a particular embodiment, the molecular weight is in the range from 100 to 750 g/mol or from 100 to 500 g/mol.

As anions, it is in principle possible to use all anions which in combination with the cation lead to an ionic liquid.

Preferred anions are chloride; bromide; iodide; thiocyanate; hexafluorophosphate; trifluoromethanesulfonate; methanesulfonate; formate; acetate; mandelate; nitrate; nitrite; trifluoroacetate; sulfate; hydrogensulfate; methylsulfate; ethylsulfate; 1-propylsulfate; 1-butylsulfate; 1-hexylsulfate; 1-octylsulfate; phosphate; dihydrogen-phosphate; hydrogenphosphate; $C_1$-$C_4$-dialkylphosphates; propionate; tetrachloroaluminate; $Al_2Cl_7^-$; chlorozincate; chloroferrate; bis(trifluoromethylsulfonyl)imide; bis(pentafluoroethylsulfonyl)imide; bis(methylsulfonyl)imide; bis(p-tolylsulfonyl)imide; tris(trifluoromethylsulfonyl)methide; bis(pentafluoroethylsulfonyl)methide; p-toluenesulfonate; tetracarbonylcobaltate; dimethylene glycol monomethyl ether sulfate; oleate; stearate; acrylate; methacrylate; maleate; hydrogencitrate; vinylphosphonate; bis(pentafluoroethyl)phosphinate; borates such as bis[salicylato(2-)]borate, bis[oxalato(2-)]borate, bis[1,2-benzenediolato(2-)-O,O']borate, tetracyanoborate, tetrafluoroborate; dicyanamide; tris(pentafluoroethyl)trifluorophosphate; tris(heptafluoropropyl)trifluorophosphate, cyclic arylphosphates such as catecholphosphate $(C_6H_4O_2)P(O)O^-$ and chlorocobaltate.

Particularly preferred anions are chloride, bromide, hydrogensulfate, tetrachloroaluminate, thiocyanate, methylsulfate, ethylsulfate, methanesulfonate, formate, acetate, dimethylphosphate, diethylphosphate, p-toluenesulfonate, tetrafluoroborate and hexafluorophosphate.

The ionic liquid is selected from the group consisting of methyltri-(1-butyl)ammonium, 2-hydroxyethylammonium, 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethyl-imidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethyl-imidazolium, 1-(1-octyl)-2,3- dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium or 1,4,5-trimethyl-3-octylimidazolium;
as cation and
chloride, bromide, hydrogensulfate, tetrachloroaluminate, thiocyanate, methylsulfate, ethylsulfate, methanesulfonate, formate, acetate, dimethylphosphate, diethylphosphate, p-toluenesulfonate, tetrafluoroborate or hexafluorophosphate; as anion.

Preferably the ionic liquid is selected from the group consisting of 1,3-dimethylimidazolium methylsulfate, 1,3-dimethylimidazolium hydrogensulfate, 1,3-dimethylimidazolium dimethylphosphate, 1-ethyl-3-methylimidazolium methylsulfate, 1-ethyl-3-methylimidazolium hydrogensulfate, 1-ethyl-3-methylimidazolium thiocyanate, 1-ethyl-3-methylimidazolium acetate, 1-ethyl-3-methylimidazolium methanesulfonate, 1-ethyl-3-methylimidazolium diethylphosphate, 1-(1-butyl)-3-methylimidazolium methylsulfate, 1-(1-butyl)-3-methylimidazolium hydrogensulfate, 1-(1-butyl)-3-methylimidazolium thiocyanate, 1-(1-butyl)-3-methylimidazolium acetate, 1-(1-butyl)-3-methylimidazolium methanesulfonate, 1-(1-dodecyl)-3-methylimidazolium methylsulfate, 1-(1-dodecyl)-3-methylimidazolium hydrogensulfate, 1-(1-tetradecyl)-3-methylimidazolium methylsulfate, 1-(1-tetradecyl)-3-methylimidazolium hydrogensulfate, 1-(1-hexadecyl)-3-methylimidazolium methylsulfate or 1-(1-hexa-decyl)-3-methylimidazolium hydrogensulfate and 2-hydroxyethylammonium formate.

More preferably the ionic liquid is selected from the group consisting of methylimidazolium chloride, 1-ethyl-3-methylimidazolium ethylsulfate, 1-butyl-3-methylimidazolium methylsulfate, 1-ethyl-3-methylimidazolium methanesulfonate, 1-ethyl-2,3-dimethylimidazolium ethylsulfate, 1-butyl-3-methylimidazolium chloride, 1-butyl-3-methylimidazolium methansulfonate, 1-ethyl-3-methylimidazolium chloride, 1-ethyl-3-methylimidazolium thiocyanate, 1-butyl-3-methylimidazolium thiocyanate.

The above mentioned cations, anions and ionic liquids and their preparation are, for example, described in WO 2005/113702, WO 2008/043837, WO 03/029329, WO 2007/076979, WO 2006/000197 and WO 2007/128268. The ionic liquids are partly items of commerce and are, for example available from BASF SE.

Non-polar thermoplastic polymers in the context of the present invention are polymers with water absorption of <1% in 24 hours at 23° C. according to ISO 62.

As non-polar thermoplastic polymers in the context of the instant invention there are, for example, understood the thermoplastic polymers mentioned below.

Polymers of mono- and di-olefins, for example polypropylene, polyisobutylene, poly-butene-1, poly-4-methylpentene-1, polyisoprene or polybutadiene and also polymerisates of cyclo-olefins, such as, for example, of cyclopentene or norbornene; and also polyethylene (which may optionally be cross-linked), for example high density polyethylene (HDPE), medium density polyethylene (MDPE), low density polyethylene (LDPE), linear low density polyethylene (LLDPE), branched low density polyethylene (BLDPE).

Polyolefins, that is to say polymers of mono-olefins, as mentioned by way of example in the preceding paragraph, especially polyethylene and polypropylene, can be prepared by various processes, especially by the following methods:
a) radically (usually at high pressure and high temperature);
b) by means of catalysts, the catalyst usually containing one or more metals of group IVb, Vb, VIb or VIII. Those metals generally have one or more ligands, such as oxides, halides, alcoholates, esters, ethers, amines, alkyls, alkenyls and/or aryls, which may be either π- or σ-coordinated. Those metal complexes may be free or fixed to carriers, such as, for example, to activated magnesium chloride, titanium(III) chloride, aluminium oxide or silicon oxide. Those catalysts may be soluble or insoluble in the polymerisation medium. The catalysts can be active as such in the polymerisation or further activators may be used, such as, for example, metal alkyls, metal hydrides, metal alkyl halides, metal alkyl oxides or metal alkyl oxanes, the metals being elements of group(s) Ia, IIa and/or IIIa. The activators may be modified, for example, with further ester, ether, amine or silyl ether groups. Those catalyst systems are usually known as Phillips, Standard Oil Indiana, Ziegler (-Natta), TNZ (DuPont), metallocene or single site catalysts (SSC).

Mixtures of the polymers mentioned above, for example mixtures of polypropylene with polyisobutylene, polypropylene with polyethylene (for example PP/HDPE, PP/LDPE) and mixtures of different types of polyethylene (for example LDPE/HDPE).

Copolymers of mono- and di-olefins with one another or with other vinyl monomers, such as, for example, ethylene/propylene copolymers, linear low density polyethylene (LLDPE) and mixtures thereof with low density polyethylene (LDPE), propylene/butene-1 copolymers, propylene/isobutylene copolymers, ethylene/butene-1 copolymers, ethylene/hexene copolymers, ethylene/methylpentene copolymers, ethylene/heptene co-polymers, ethylene/octene copolymers, propylene/butadiene copolymers, isobutylene/isoprene copolymers.

Polystyrene, poly(p-methylstyrene), poly(α-methylstyrene).

Copolymers of styrene or α-methylstyrene with dienes or acrylic derivatives, such as, for example, styrene/butadiene, styrene/acrylonitrile, styrene/alkyl methacrylate, styrene/butadiene/alkyl acrylate and methacrylate, styrene/maleic acid anhydride, styrene/acrylonitrile/methyl acrylate; high-impact-strength mixtures consisting of styrene copolymers and another polymer, such as, for example, a polyacrylate, a diene polymer or an ethylene/propylene/diene terpolymer; and also block copolymers of styrene, such as, for example, styrene/butadiene/styrene, styrene/isoprene/styrene, styrene/ethylene-butylene/styrene or styrene/ethylene-propylene/styrene.

Graft copolymers of styrene or α-methylstyrene, such as, for example, styrene on polybutadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic acid anhydride on polybutadiene; styrene, acrylonitrile and maleic acid anhydride or maleic acid imide on polybutadiene; styrene and maleic acid imide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 6), such as those known, for example, as so-called ABS, MBS, ASA, SAN or AES polymers.

Polyamide 6,10, 6,9, 6,12, 4,6, 12,12, polyamide 11, polyamide 12

Halogen-containing polymers, such as, for example, polyvinyl chloride, polyvinylidene chloride, polyvinyl fluoride, polyvinylidene fluoride; and copolymers thereof, such as vinyl chloride/vinylidene chloride.

For example, the non-polar thermoplastic or elastomeric polymer is selected from the group consisting of polyethylene and copolymers thereof, polypropylene and copolymers thereof, thermoplastic polyolefins, thermoplastic elastomers, ethylene propylene terpolymer rubber, polybutylen, styrene and copolymers thereof, thermoplastic polyolefins, polyamide 12 and polyvinylchloride.

For instance, the non-polar thermoplastic or elastomeric polymer is selected from the group consisting of polyethylene and copolymers thereof, polypropylene and copolymers thereof and styrene and copolymers thereof.

Typically the amount of the ionic liquid, component b) is from 0.1 to 5%, preferably 0.1 to 3% by weight, based on the weight of the polar thermoplastic polymer, component a).

Preferably the composition, mixture of component a) and b), is used in an amount of from 2 to 30%, preferably 5 to 25% by weight, based on the weight of the non-polar thermoplastic polymer.

In a specific embodiment of the invention further additives selected from the group consisting of light stabilizers, heat stabilizers, processing stabilizers, pigments, fillers, and clarifying agents are present.

The antistatic polymer composition may comprise further additives. Those further additives belong especially to the group of the antioxidants, UV absorbers and/or light stabilisers. The thermal stabilisation covers both processing and use (long-term stability). Those further additives are known to the person skilled in the art and are for the most part commercially available.

Suitable antioxidants are, for example:
1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-di-cyclopentyl-4-methylphenol, 2-(α-methylcyclohexyl)-4,6-dimethylphenol, 2,6-di-octadecyl-4-methylphenol, 2,4,6-tri-cyclohexylphenol, 2,6-di-tert-butyl-4-methoxymethyl phenol, 2,6-di-nonyl-4-methylphenol, 2,4-dimethyl-6-(1'-methyl-undec-1'-yl)-phenol, 2,4-dimethyl-6-(1'-methyl-heptadec-1'-yl)-phenol, 2,4-dimethyl-6-(1'-methyl-tridec-1-yl)-phenol, octylphenol, nonylphenol and mixtures thereof.
2. Alkylthiomethylphenols, for example 2,4-di-octylthiomethyl-6-tert-butylphenol, 2,4-di-octylthiomethyl-6-methylphenol, 2,4-di-octylthiomethyl-6-ethylphenol, 2,6-di-dodecyl-thiomethyl-4-nonylphenol.
3. Hydroquinones and alkylated hydroquinones, for example 2,6-di-tert-butyl-4-methoxyphenol, 2,5-di-tert-butyl-hydroquinone, 2,5-di-tert-amyl-hydroquinone, 2,6-diphenyl-4-octadecyloxyphenol, 2,6-di-tert-butyl-hydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.
4. Hydroxylated thiodiphenyl ethers, for example 2,2'-thio-bis(6-tert-butyl-4-methyl-phenol), 2,2'-thio-bis(4-octylphenol), 4,4'-thio-bis(6-tert-butyl-3-methylphenol), 4,4'-thio-bis(6-tert-butyl-2-methylphenol), 4,4'-thio-bis(3,6-di-sec-amylphenol), 4,4'-bis(2,6-dimethyl-4-hydroxyphenyl)disulfide.
5. Alkylidene bisphenols, for example 2,2'-methylene-bis(6-tert-butyl-4-methylphenol), 2,2'-methylene-bis(6-tert-butyl-4-ethylphenol), 2,2'-methylene-bis[4-methyl-6-(α-methylcyclohexyl)-phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutyl-phenol), 2,2'-methylene-bis[6-(α-methylbenzyl)-4-nonylphenol], 2,2'-methylene-bis[6-(α,α-dimethylbenzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4-hydroxy-2-methyl-phenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(4-hydroxyphenyl)propane, 2,2-bis(5-tert-butyl-4-hydroxy-2-methylphenyl)-4-n-dodecylmercapto-butane, 1,1,5,5-tetra(5-tert-butyl-4-hydroxy-2-methylphenyl)pentane.
6. O-, N- and S-benzyl compounds, for example 3,5,3',5'-tetra-tert-butyl-4,4'-dihydroxy-dibenzyl ether, octadecyl-4-hydroxy-3,5-dimethylbenzyl-mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzyl-mercaptoacetate.
7. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, di-[4-(1,1,3,3-tetramethylbutyl)-phenyl]-2,2-bis(3,5-di-tert-butyl-4-hydroxybenzyl) malonate.
8. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)-phenol.
9. Triazine compounds, for example 2,4-bis-octylmercapto-6-(3,5-di-tert-butyl-4-hydroxyanilino)-1,3,5-triazine, 2-octylmercapto-4,6-bis(3,5-di-tert-butyl-4-hydroxy-anilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.
10. Phosphonates, phosphites and phosphonites, for example dimethyl-2,5-di-tert-butyl-4-hydroxybenzyl phosphonate, diethyl-3,5-di-tert-butyl-4-hydroxybenzyl phosphonate, dioctadecyl-3,5-di-tert-butyl-4-hydroxybenzyl phosphonate, dioctadecyl-5-tert-butyl-4-hydroxy-3-methylbenzyl phosphonate, calcium salt of 3,5-di-tert-butyl-4-hydroxybenzylphosphonic acid monoethyl ester, triphenylphosphite, diphenyl-alkylphosphites, phenyldialkylphosphites, tris(nonylphenyl)phosphite, trilaurylphosphite, trioctadecylphosphite, distearylpentaerythritol diphosphite, tris(2,4-di-tert-butylphenyl)phosphite, diisodecylpentaerythritol diphosphite, bis(2,4-di-tert-butylphenyl)pentaerythritol diphosphite, bis(2,6-di-tert-butyl-4-methylphenyl)-pentaerythritol diphosphite, bisisodecyloxy-pentaerythritol diphosphite, bis(2,4-di-tert-butyl-6-methylphenyl)-pentaerythritol diphosphite, bis(2,4,6-tri-tert-butylphenyl)-pentaerythritol diphosphite, tristearyl-sorbitol triphosphite, tetrakis(2,4-di-tert-butylphenyl)-4,4'-biphenylene diphosphonite, 6-isooctyloxy-2,4,8,10-tetra-tert-butyl-12H- dibenz[d,g]-1,3,2-dioxaphosphocine, 6-fluoro-2,4,8,10-tetra-tert-butyl-12-methyl-dibenz[d,g]1,3,2-dioxaphosphocine, bis(2,4-di-tert-butyl-6-methylphenyl)methylphosphite, bis(2,4-di-tert-butyl-6-methylphenyl)ethylphosphite, $(C_9H_{19}-C_6H_4)_{1.5}-P-(O-C_{12-13}H_{25-27})_{1.5}$.

11. Acylaminophenols, for example 4-hydroxylauric acid anilide, 4-hydroxystearic acid anilide, N-(3,5-di-tert-butyl-4-hydroxyphenyl)carbamic acid octyl ester.

12. Esters of β-(3,5-di-tert-butyl-4-hydroxyphenyl)-propionic acid with mono- or poly-hydric alcohols, such as, for example, with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

13. Esters of β-(5-tert-butyl-4-hydroxy-3-methylphenyl)-propionic acid with mono- or poly-hydric alcohols, such as, for example, with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

14. Esters of β-(3,5-dicyclohexyl-4-hydroxyphenyl)-propionic acid with mono- or polyhydric alcohols, such as, for example, with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

15. Esters of 3,5-di-tert-butyl-4-hydroxyphenylacetic acid with mono- or poly-hydric alcohols, such as, for example, with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxy)ethyl isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

16. Amides of β-(3,5-di-tert-butyl-4-hydroxyphenyl)propionic acid, such as, for example, N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

17. Esters of thiodiacetic acid and thiodipropionic acid

Preferred are antioxidants of groups 5, 10 and 14, especially 2,2-bis(4-hydroxyphenyl)-propane, esters of 3,5-di-tert-butyl-4-hydroxyphenylpropionic acid with octadecanol or pentaerythritol or tris-(2,4-di-tert-butylphenyl)-phosphite.

If desired, a mixture of antioxidants of different structures may also be used.

The antioxidants may be used in an amount of, for example, from 0.01 to 10, advantageously from 0.1 to 10, and especially from 0.1 to 5, parts by weight, based on 100 parts by weight of polymer.

Suitable UV-absorbers and light stabilisers are, for example:

1. 2-(2'-Hydroxyphenyl)-benzotriazoles, such as, for example, 2-(2'-hydroxy-5'-methyl-phenyl)-benzotriazole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,1,3,3-tetramethylbutyl)-phenyl)-benzotriazole, 2-(3',5'-di-tert-butyl-2'-hydroxyphenyl)-5-chloro-benzotriazole, 2-(3'-tert-butyl-2'-hydroxy-5'-methylphenyl)-5-chlorobenzotriazole, 2-(3'-sec-butyl-5'-tert-butyl-2'-hydroxy-phenyl)-benzotriazole, 2-(2'-hydroxy-4'-octyloxyphenyl)-benzotriazole, 2-(3',5'-di-tert-amyl-2'-hydroxyphenyl)-benzotriazole, 2-(3',5'-bis(a,a-dimethylbenzyl)-2'-hydroxyphenyl)-benzotriazole, mixture of 2-(3'-tert-butyl-2'-hydroxy-5'-(2-octyloxy-carbonylethyl)phenyl)-5-chlorobenzotriazole, 2-(3'-tert-butyl-5'-[2-(2-ethylhexyloxy)-carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxy-carbonylethyl)phenyl)-benzotriazole, 2-(3'-tert-butyl-5'-[2-(2-ethylhexyloxy)carbonyl-ethyl]-2'-hydroxyphenyl)-benzotriazole, 2-(3'-dodecyl-2'-hydroxy-5'-methylphenyl)-benzotriazole, and 2-(3'-tert-butyl-2'-hydroxy-5'-(2-isooctyloxycarbonylethyl)phenyl-benzotriazole, 2,2'-methylene-bis[4-(1,1,3,3-tetramethylbutyl)-6-benzotriazol-2-yl-phenol]; transesterification product of 2-[3'-tert-butyl-5'-(2-methoxycarbonylethyl)-2'-hydroxyphenyl]-benzotriazole with polyethylene glycol 300; [R—CH$_2$CH$_2$—COO(CH$_2$)$_3$]— in which R=3'-tert-butyl-4'-hydroxy-5'-2H-benzotriazol-2-yl-phenyl.

2. 2-Hydroxybenzophenones, such as, for example, the 4-hydroxy, 4-methoxy, 4-octyloxy, 4-decyloxy, 4-dodecyloxy, 4-benzyloxy, 4,2',4'-trihydroxy, 2'-hydroxy-4,4'-dimethoxy derivative.

3. Esters of unsubstituted or substituted benzoic acids, such as, for example, 4-tert-butyl-phenylsalicylate, phenylsalicylate, octylphenylsalicylate, dibenzoylresorcinol, bis(4-tert-butylbenzoyl)resorcinol, benzoylresorcinol, 3,5-di-tert-butyl-4-hydroxybenzoic acid 2,4-di-tert-butyl-phenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

4. Acrylates, such as, for example, α-cyano-β,β-diphenylacrylic acid ethyl ester or isooctyl ester, α-methoxycarbonylcinnamic acid methyl ester, α-cyano-β-methyl-p-methoxycinnamic acid methyl ester or butyl ester, α-methoxycarbonyl-p-methoxy-cinnamic acid methyl ester, N-(β-methoxycarbonyl-β-cyanovinyl)-2-methyl-indoline.

5. Nickel compounds, such as, for example, nickel complexes of 2,2'-thio-bis[4-(1,1,3,3-tetramethylbutyl)phenol], such as the 1:1 or 1:2 complex, optionally with additional ligands, such as n-butylamine, triethanolamine or N-cyclohexyl-diethanolamine, nickel dibutyl dithiocarbamate, nickel salts of 4-hydroxy-3,5-di-tert-butylbenzyl-phosphonic acid monoalkyl esters, such as of the methyl or ethyl ester, nickel complexes of ketoximes, such as of 2-hydroxy-4-methylphenylundecyl ketoxime, nickel complexes of 1-phenyl-4-lauroyl-5-hydroxypyrazole, optionally with additional ligands.

6. Sterically hindered amines, such as, for example, bis(2,2,6,6-tetramethyl-piperidyl)-sebacate, bis(2,2,6,6-tetramethylpiperidyl)succinate, bis(1,2,2,6,6-pentamethyl-piperidyl) sebacate, n-butyl-3,5-di-tert-butyl-4-hydroxybenzylmalonic acid bis(1,2,2,6,6-pentamethylpiperidyl)ester, condensation product of 1-hydroxyethyl-2,2,6,6-tetramethyl-4-hydroxypiperidine and succinic acid, condensation product of N,N'-bis (2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)nitrilotriacetate, tetra-kis(2,2,6,6-tetramethyl-4-piperidyl)-1,2,3,4-butanetetraoate, 1,1'-(1,2-ethanediyl)-bis(3,3,5,5-tetramethyl-piperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, condensation product of N,N'-bis(2,2,6,6-tetramethyl-4-piperidyl)-hexamethylenediamine and 4-morpholino-2,6-dichloro-1,3,5-triazine, condensation product of 2-chloro-4,6-di(4-n-butylamino-2,2,6,6-tetramethylpiperidyl)-1,3,5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)-pyrrolidine-2,5-dione, and Chimassorb966.

7. Oxalic acid diamides, such as, for example, 4,4'-di-octyloxy-oxanilide, 2,2'-di-octyloxy-5,5'-di-tert-butyl-oxanilide, 2,2'-di-dodecyloxy-5,5'-di-tert-butyl-oxanilide, 2-ethoxy-2'-ethyl-oxanilide, N,N'-bis(3-dimethylaminopropyl)oxalamide, 2-ethoxy-5-tert-butyl-2'-ethyl-oxanilide and a mixture thereof with 2-ethoxy-2'-ethyl-5,4'-di-tert-butyl-oxanilide, mixtures of o- and p-methoxy- and of o- and p-ethoxy-disubstituted oxanilides.

8. 2-(2-Hydroxyphenyl)-1,3,5-triazines, such as, for example, 2,4,6-tris(2-hydroxy-4-octyloxyphenyl)-1,3,5-triazine, 2-(2-hydroxy-4-octyloxyphenyl)-4,6-bis(2,4-dimethyl-phenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxy-propyloxy)phenyl]-4,6-bis(2,4-dimethylphenyl)-1,3,5-triazine, 2-[2-hydroxy-4-(2-hydroxy-3-octyloxy-propyloxy)phenyl]-4,6-bis(2,4-dimethylphenyl)-1,3,5-triazine.

Suitable peroxide-destroying compounds are, for example: esters of β-thio-dipropionic acid, for example lauryl, stearyl, myristyl or tridecyl esters, mercaptobenzimidazole, the zinc salt of 2-mercaptobenzimidazole, zinc dibutyl-dithio-carbamate, dioctadecyl disulfide, pentaerythritol-tetrakis(β-dodecylmercapto)propionate and ethylene glycol bismercaptoacetate.

The above further additives are typically added in an amount from 0.1 to 5% by weight, based on the weight of the non-polar thermoplastic or elastomeric polymer substrate.

A further aspect of the invention is a process for the preparation of an antistatic non-polar thermoplastic or elastomeric polymer comprising incorporating in the non-polar thermoplastic or elastomeric polymer a mixture of
 a) a polar thermoplastic polymer; and
 b) an organic ionic liquid where the ionic liquid is selected from the group consisting of
 methyltri-(1-butyl)ammonium, 2-hydroxyethylammonium, 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butyl-imidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethyl-imidazolium, 1-(1-hexyl)-2,3-dimethyl-imidazolium, 1-(1-octyl)-2,3-dimethyl-imidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium or 1,4,5-trimethyl-3-octylimidazolium;
 as cation and
 chloride, bromide, hydrogensulfate, tetrachloroaluminate, thiocyanate, methylsulfate, ethylsulfate, methanesulfonate, formate, acetate, dimethylphosphate, diethylphosphate, p-toluenesulfonate, tetrafluoroborate or hexafluorophosphate;
 as anion.

The mixture of the polar thermoplastic polymer and the organic ionic liquid is preferably added together as a premix. In a specific embodiment the organic ionic liquid is soaked from the polar thermoplastic polymer, which mixture is then added to the non-polar thermoplastic or elastomeric polymer.

The preparation may be carried out in a manner known per se by mixing or soaking the said components and, if desired, further additives with the polymer using devices known per se, such as calenders, mixers, kneaders, extruders and the like. The further additives may be added individually or in admixture with one another. It is also possible to use so-called master batches.

An antistatic non polar thermoplastic polymer obtainable according to the present invention can be made into the desired form in known manner. Such processes include, for example, grinding, calendering, extruding, injection-moulding, sintering, compression/sintering or spinning, also extrusion blow-moulding, or processing according to the plastisol method. The antistatic non-polar thermoplastic polymer may also be processed to form foamed materials.

Also an aspect of the invention is a composition comprising a mixture of
 a) a polar thermoplastic polymer; and
 b) an organic ionic liquid where the ionic liquid is selected from the group consisting of
 methyltri-(1-butyl)ammonium, 2-hydroxyethylammonium, 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3- octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butyl-imidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethyl-imidazolium, 1-(1-hexyl)-2,3-dimethyl-imidazolium, 1-(1-octyl)-2,3-dimethyl-imidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium or 1,4,5-trimethyl-3-octylimidazolium;

as cation and chloride, bromide, hydrogensulfate, tetrachloroaluminate, thiocyanate, methylsulfate, ethylsulfate, methanesulfonate, formate, acetate, dimethylphosphate, diethylphosphate, p-toluenesulfonate, tetrafluoroborate or hexafluorophosphate;

as anion;

incorporated in a non-polar thermoplastic or elastomeric polymer.

The definitions and preferences given above apply equally for all aspects of the invention.

The following examples illustrate the invention.

Example 1

Materials Used

PP Polypropylene homo polymer, MFR 4 (230° C./2.16 kg) from Borealis

IPS Polystyrene High Impact, MFR 10 (200° C./5 kg) from Styron LLC

Ionic Liquid 1, 1-Ethyl-3-methylimidazolium-ethylsulfat (EMIM-ES), from BASF SE

PO Polar thermoplastic polymer, compatibilizing resin for the ionic liquid (IL) in the polymer matrix PO1 Polyetheresteramide, Irgastat® P 16, from BASF SE PO2 Ethylene copolymer based extremely hygroscopic ionomer resin, Entira AS MK 400, from DuPont PO3 Thermoplastic Polyurethane Elastomer (Polyether), Elastollane 1190 A 10, from BASF SE PO4 Thermoplastic Polyurethane Elastomer, Desmopan DP 6580 A MVT, from Bayer Material Science PO5 Thermoplastic Copolyester Elastomer, Arnitel Vt. 3108, from DSM Engineering Plastics Impregnation (Soaking) of the Polar Thermoplastic Polymer Method A 396 g PO1 (pellets) are given into a round bottom flask. 4 g IL1 is added. After 4 hours rotating of the mixture at 55° C. IL1 is completely soaked from the PO. The mixture is dried under vacuum at 90° C. for 16 hours.

The soaked pellets are compression molded at 200° C. for 3 minutes. The surface resistivity according to ASTM D257 (23° C./50% r.h.) is 1 E+08 ohm/sq.

Method B 396 g of the respective PO (pellets) are given into a round bottom flask. 4 g IL1 dissolved in 20 g water are added. After 3 hours rotating of the mixture at 55° C. the IL1 solution is completely soaked from the PO. The mixture is dried under vacuum at 90° C. for 16 hours.

The soaked pellets are compression molded at 200° C. for 3 minutes. The surface resistivity according to ASTM D257 (23° C./50% r.h.) is measured. Results are presented in Table 1.

Testing of Surface Resistivity

The surface resistivity is measured according to ASTM D257. The measurement is done with a test voltage of 500 V and a ring electrode.

TABLE 1

Impregnated (soaked) polar thermoplastic polymers (Method B)

| Example | PO Type | PO % w/w | Content IL1 [% w/w] | Surface resistivity [ohm/sq.] |
|---------|---------|----------|---------------------|-------------------------------|
| I-CE-1  | PO1     | 100.0    | 0.0                 | 1E+10                         |
| I-1     | PO1     | 99.5     | 0.5                 | 2E+08                         |
| I-2     | PO1     | 99.0     | 1.0                 | 1E+08                         |
| I-3     | PO1     | 98       | 2.0                 | 4E+07                         |
| I-CE-2  | PO2     | 100.0    | 0.0                 | 7E+09                         |
| I-4     | PO2     | 99.0     | 1.0                 | 2E+08                         |
| I-CE-3  | PO3     | 100.0    | 0.0                 | 7E+14                         |
| I-5     | PO3     | 99.0     | 1.0                 | 4E+11                         |
| I-CE-4  | PO4     | 100.0    | 0.0                 | 4E+10                         |
| I-6     | PO4     | 99.0     | 1.0                 | 1E+09                         |
| I-CE-5  | PO5     | 100.0    | 0.0                 | 2E+10                         |
| I-7     | PO5     | 99.0     | 1.0                 | 6E+08                         |

I means Impregnation of polar thermoplastic polymer
CE means Comparative Example Percentages are always by weight, based on the weight of the respective polymer.

The impregnation of the polar polymers with ionic liquid reduces surface resistivity by at least one order of magnitude.

Antistatic Thermoplastic Articles

EXAMPLES

PP or IPS pellets are dry-blended with different concentrations of conductive pellets, prepared as described in Method B (compositions from Table 1). The mixtures are injection molded at 230° C. to 2 mm thick plaques. The surface resistivity of the plaques is determined. The compositions and the resulting surface resistivity are presented in Table 2 together with the comparative examples CE-1 to CE-12 which have been prepared analogously.

TABLE 2

Use of the impregnated hydrophilic polymers as antistatic additives in a non polar polymer matrix

|         | Polymer matrix | | Hydrophilic polymer | | | | Surface resistivity [ohm/sq.] |
|---------|------|---------|------|---------|---------|---------------|-----|
|         | Type | [% w/w] | Type | From Example | [% w/w] | Content IL1 [% w/w] | |
| PM-CE-1 | PP   | 100     | —    | —       | —       | —             | >1E+14 |
| PM-CE-2 | PP   | 85      | PO1  | I-CE-1  | 15      | —             | 3E+12 |

TABLE 2-continued

Use of the impregnated hydrophilic polymers as antistatic additives in a non polar polymer matrix

| | Polymer matrix | | Hydrophilic polymer | | | Content IL1 | Surface resistivity |
|---|---|---|---|---|---|---|---|
| | Type | [% w/w] | From Type | Example | [% w/w] | [% w/w] | [ohm/sq.] |
| PM-1 | PP | 85 | PO1 | I-2 | 15 | 1 | 4E+09 |
| PM-CE-3 | PP | 85 | PO2 | I-CE-2 | 15 | — | 4E+11 |
| PM-2 | PP | 85 | PO2 | I-4 | 15 | 1 | 3E+11 |
| PM-CE-4 | PP | 85 | PO3 | I-CE-3 | 15 | — | 3E+14 |
| PM-3 | PP | 85 | PO3 | I-5 | 15 | 1 | 5E+13 |
| PM-CE-5 | PP | 85 | PO4 | I-CE-4 | 15 | — | 1E+13 |
| PM-4 | PP | 85 | PO4 | I-6 | 15 | 1 | 5E+11 |
| PM-CE-6 | PP | 85 | PO5 | I-CE-5 | 15 | — | 2E+13 |
| PM-5 | PP | 85 | PO5 | I-7 | 15 | 1 | 1E+12 |
| PM-CE-7 | IPS | 100 | — | — | — | — | >1E+14 |
| PM-CE-8 | IPS | 85 | PO1 | I-CE-1 | 15 | — | 3E+12 |
| PM-6 | IPS | 85 | PO1 | I-2 | 15 | 1 | 4E+09 |
| PM-CE-9 | IPS | 85 | PO2 | I-CE-2 | 15 | — | 4E+11 |
| PM-7 | IPS | 85 | PO2 | I-4 | 15 | 1 | 3E+11 |
| PM-CE-10 | IPS | 85 | PO3 | I-CE-3 | 15 | — | 3E+14 |
| PM-8 | IPS | 85 | PO3 | I-5 | 15 | 1 | 5E+13 |
| PM-CE-11 | IPS | 85 | PO4 | I-CE-4 | 15 | — | 1E+13 |
| PM-9 | IPS | 85 | PO4 | I-6 | 15 | 1 | 5E+11 |
| PM-CE-12 | IPS | 85 | PO5 | I-CE-5 | 15 | — | 2E+13 |
| PM-10 | IPS | 85 | PO5 | I-7 | 15 | 1 | 1E+12 |

PM means Polymer Matrix
CE means Comparative Example

All examples containing the ionic liquid exhibit significant lower surface resistivity as compared to the corresponding comparative examples.

Example 2

The polar thermoplastic polymer used is given below:

A1: Polyamide 6 displaying a Viscosity Number (VN) of 150 ml/g.

Ionic Liquid:

The tested ionic liquids are listed below:

B1: 1-ethyl-3-methylimidazolium Triflimid (CAS #174899-82-2)

B2: 1-ethyl-3-methylimidazolium ethylsulfate (CAS #342573-75-5)

B3: 1-ethyl-3-methylimidazolium tetrafluoroborate (CAS#143314-16-3)

B4: 1-ethyl-3-methylimidazolium triflate (CAS#145022-44-2)

Characterisation Methods:

Viscosity Number of Polyamide is measured according to ISO307 as a 0.5 wt.-% solution in 96 wt.-% Sulfuric acid at 25° C.

Electrical conductivity: The volume resistivity of the sample is determined using a 4-point measurement. To ensure a good contact between the electrodes and the sample, four silver-electrodes are directly painted on the sample using a conductive silver paste (Leitsilber 200 from Hans Wolbring GmbH).

The measurement is performed either on injection moulded samples. For injected plates, the samples are prepared and standard measurements are performed perpendicular to the injection direction.

The instruments used are listed below:
Power source: Keithley Instruments, 225 Current Source.
Voltage measurement: Keithley Instruments, 617 Programmable Electrometer.
Current measurement: Keithley Instruments, 1000 Multimeter.

Processing Description

The samples are prepared with a co-rotating twin screw extruder from the company Coperion—ZSK18, i.e. with a screw diameter of 18 mm with various processing zones. There are feeding zone, melting zone, conveying zone, degassing zone, dispersion zone etc.

The neat polymer is fed in the initial zone (cold feed). The ionic liquid (B) is fed through zone 4 (hot feed) by using a gear pump. The throughput is fixed for 5 kg/h, the screw speed is 400 rpm constant. The compositions are detailed in Table 3.

The products are granulated and further processed on an injection moulding machine (injection moulding machine: Arburg 420C, melt T=260° C., Mould T=80° C.).

TABLE 3

| | A | Wt-. % | B | Wt-. % | Volume resistivity [Ohm*cm] |
|---|---|---|---|---|---|
| Ref. 1 | A1 | 100 | — | — | 8.81E+13 |
| sample 1 | A1 | 97 | B1 | 3 | 1.24E+10 |
| sample 2 | A1 | 97 | B2 | 3 | 2.72E+09 |
| sample 3 | A1 | 97 | B3 | 3 | 1.48E+09 |
| sample 4 | A1 | 97 | B4 | 3 | 4.26E+09 |

The invention claimed is:

1. A process for of preparing an antistatic non-polar thermoplastic or elastomeric polymer, the method comprising:
incorporating in the non-polar thermoplastic or elastomeric polymer a mixture of
a polar thermoplastic polymer and
an organic ionic liquid wherein a cation of the organic ionic liquid is selected from the group consisting of methyltri-(1-butyl)ammonium, 2-hydroxyethylammonium, 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium, and 1,4,5-trimethyl-3-octylimidazolium, an anion of the organic ionic liquid is chloride, bromide, hydrogensulfate, tetrachloroaluminate, thiocyanate, methylsulfate, ethylsulfate, methanesulfonate, formate, acetate, dimethylphosphate, diethylphosphate, p-toluenesulfonate, tetrafluoroborate, or hexafluorophosphate, and the mixture is from 2 to 30% by weight of the non-polar thermoplastic or elastomeric polymer.

2. The process according to claim 1, wherein the polar thermoplastic polymer is selected from the group consisting of ionomer, polyethylene glycol modified copolyester, polybutyleneterephthalate, copolyester elastomers, polyamide 6, polyamide 6.6, polyether-block-amide, polyetherester, polyetheramide, polyetheresteramide, polyoxymethylene, thermoplastic polyurethane, polyphenylene oxide, and polyvinylpyrolidone.

3. The process according to claim 1, wherein the polar thermoplastic polymer is selected from the group consisting of ionomer, polyethylene glycol modified polyethyleneterephthalate, copolyester elastomers, polyether-block-amide, polyetheresteramide, polyetherester, polyetheramide, thermoplastic polyurethane, and polyvinylpyrolidone.

4. The process according to claim 1, wherein the polar thermoplastic polymer is selected from the group consisting of ionomer, polyethylene glycol modified polyethyleneterephthalate, polyamide, copolyester elastomers, polyetheresteramide, and thermoplastic polyurethane.

5. The process according to claim 1, wherein the ionic liquid is selected from the group consisting of 1,3-dimethylimidazolium methylsulfate, 1,3-dimethylimidazolium hydrogensulfate, 1,3-dimethylimidazolium dimethylphosphate, 1-ethyl-3-methylimidazolium methylsulfate, 1-ethyl-3-methylimidazolium hydrogensulfate, 1-ethyl-3-methylimidazolium thiocyanate, 1-ethyl-3-methylimidazolium acetate, 1-ethyl-3-methylimidazolium methanesulfonate, 1-ethyl-3-methylimidazolium diethylphosphate, 1-(1-butyl)-3-methylimidazolium methylsulfate, 1-(1-butyl)-3-methylimidazolium hydrogensulfate, 1-(1-butyl)-3-methylimidazolium thiocyanate, 1-(1-butyl)-3-methylimidazolium acetate, 1-(1-butyl)-3-methylimidazolium methanesulfonate, 1-(1-dodecyl)-3-methylimidazolium methylsulfate, 1-(1-dodecyl)-3-methylimidazolium hydrogensulfate, 1-(1-tetradecyl)-3-methylimidazolium methylsulfate, 1-(1-tetradecyl)-3-methylimidazolium hydrogensulfate, 1-(1-hexadecyl)-3-methylimidazolium methylsulfate or 1-(1-hexadecyl)-3-methylimidazolium hydrogensulfate, and 2-hydroxyethylammonium formate.

6. The process according to claim 1, wherein the ionic liquid is selected from the group consisting of methylimidazolium chloride, 1-ethyl-3-methylimidazolium ethylsulfate, 1-butyl-3-methylimidazolium methylsulfate, 1-ethyl-3-methylimidazolium methanesulfonate, 1-ethyl-2,3-dimethylimidazolium ethylsulfate, 1-butyl-3-methylimidazolium chloride, 1-butyl-3-methylimidazolium methansulfonate, 1-ethyl-3-methylimidazolium chloride, 1-ethyl-3-methylimidazolium thiocyanate, and 1-butyl-3-methylimidazolium thiocyanate.

7. The process according to claim 1, wherein the non-polar thermoplastic or elastomeric polymer is selected from the group consisting of polyethylene or copolymers thereof, polypropylene or copolymers thereof, thermoplastic polyolefins, thermoplastic elastomers, ethylene propylene terpolymer rubber, polybutylen, styrene or copolymers thereof, thermoplastic polyolefins, polyamide 12, and polyvinylchloride.

8. The process according to claim 1, wherein the non-polar thermoplastic or elastomeric polymer is selected from the group consisting of polyethylene or copolymers thereof, polypropylene or copolymers thereof, and styrene or copolymers thereof.

9. The process according to claim 1, wherein an amount of the ionic liquid is from 0.1 to 5% by weight, based on the weight of the polar thermoplastic polymer.

10. The process according to claim 1, wherein the mixture is from 5 to 25% by weight of the non-polar thermoplastic or elastomeric polymer.

11. The process according to claim 1, wherein further comprising at least one additional additive selected from the group consisting of light stabilizers, heat stabilizers, processing stabilizers, pigments, fillers, and clarifying agents.

12. A composition comprising a mixture of
a polar thermoplastic polymer and
an organic ionic liquid
wherein a cation of the organic ionic liquid is selected from the group consisting of methyltri-(1-butyl)ammonium, 2-hydroxyethylammonium, 1-methylimidazolium, 1-ethylimidazolium, 1-(1-butyl)imidazolium, 1-(1-octyl)imidazolium, 1-(1-dodecyl)imidazolium, 1-(1-tetradecyl)imidazolium, 1-(1-hexadecyl)imidazolium, 1,3-dimethylimidazolium, 1-ethyl-3-methylimidazolium, 1-(1-butyl)-3-methylimidazolium, 1-(1-butyl)-3-ethylimidazolium, 1-(1-hexyl)-3-methylimidazolium, 1-(1-hexyl)-3-ethylimidazolium, 1-(1-hexyl)-3-butylimidazolium, 1-(1-octyl)-3-methylimidazolium, 1-(1-octyl)-3-ethylimidazolium, 1-(1-octyl)-3-butylimidazolium, 1-(1-dodecyl)-3-methylimidazolium, 1-(1-dodecyl)-3-ethylimidazolium, 1-(1-dodecyl)-3-butylimidazolium, 1-(1-dodecyl)-3-octylimidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3- butylimidazolium, 1-(1-hexadecyl)-3-octylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethylimidazolium, 1,3,4,5-tetramethylimidazolium, 1,4,5-trimethyl-3-ethylimidazolium, 1,4,5-trimethyl-3-butylimidazolium, and 1,4,5-trimethyl-3-octylimidazolium, an anion of the organic ionic liquid is chloride, bromide, hydrogensulfate, tetrachloroaluminate, thiocyanate, methylsulfate, ethylsulfate, methanesulfonate, formate, acetate, dimethylphosphate, diethylphosphate, p-toluene-sulfonate, tetrafluoroborate, or hexafluorophosphate, the mixture is incorporated in a non-polar thermoplastic or elastomeric polymer, and the mixture is from 2 to 30% by weight of the non-polar thermoplastic or elastomeric polymer.

13. The composition according to claim 12, wherein the polar thermoplastic polymer is selected from the group consisting of ionomer, polyethylene glycol modified copolyester, polybutyleneterephthalate, copolyester elastomers, polyamide 6, polyamide 6.6, polyether-block-amide, polyetherester, polyetheramide, polyetheresteramide, polyoxymethylene, thermoplastic polyurethane, polyphenylene oxide, and polyvinylpyrolidone.

14. The composition according to claim 12, wherein the polar thermoplastic polymer is selected from the group consisting of ionomer, polyethylene glycol modified polyethyleneterephthalate, copolyester elastomers, polyether-block-amide, polyetheresteramide, polyetherester, polyetheramide, thermoplastic polyurethane, and polyvinylpyrolidone.

15. The composition according to claim 12, wherein the polar thermoplastic polymer is selected from the group consisting of ionomer, polyethylene glycol modified polyethyleneterephthalate, polyamide, copolyester elastomers, polyetheresteramide, and thermoplastic polyurethane.

16. The composition according to claim 12, wherein the ionic liquid is selected from the group consisting of 1,3-dimethylimidazolium methylsulfate, 1,3-dimethylimidazolium hydrogensulfate, 1,3-dimethylimidazolium dimethylphosphate, 1-ethyl-3-methylimidazolium methylsulfate, 1-ethyl-3-methylimidazolium hydrogensulfate, 1-ethyl-3-methylimidazolium thiocyanate, 1-ethyl-3-methylimidazolium acetate, 1-ethyl-3-methylimidazolium methanesulfonate, 1-ethyl-3-methylimidazolium diethylphosphate, 1-(1-butyl)-3-methylimidazolium methylsulfate, 1-(1-butyl)-3-methylimidazolium hydrogensulfate, 1-(1-butyl)-3-methylimidazolium thiocyanate, 1-(1-butyl)-3-methylimidazolium acetate, 1-(1-butyl)-3-methylimidazolium methanesulfonate, 1-(1-dodecyl)-3-methylimidazolium methylsulfate, 1-(1-dodecyl)-3-methylimidazolium hydrogensulfate, 1-(1-tetradecyl)-3-methylimidazolium methylsulfate, 1-(1-tetradecyl)-3-methylimidazolium hydrogensulfate, 1-(1-hexadecyl)-3-methylimidazolium methylsulfate or 1-(1-hexadecyl)-3-methylimidazolium hydrogensulfate, and 2-hydroxyethylammonium formate.

17. The composition according to claim 12, wherein the ionic liquid is selected from the group consisting of methylimidazolium chloride, 1-ethyl-3-methylimidazolium ethylsulfate, 1-butyl-3-methyl-imidazolium methylsulfate, 1-ethyl-3-methylimidazolium methanesulfonate, 1-ethyl-2,3-dimethyl-imidazolium ethylsulfate, 1-butyl-3-methylimidazolium chloride, 1-butyl-3-methylimidazolium methansulfonate, 1-ethyl-3-methylimidazolium chloride, 1-ethyl-3-methylimidazolium thiocyanate, and 1-butyl-3-methylimidazolium thiocyanate.

18. The composition according to claim 12, wherein the non-polar thermoplastic or elastomeric polymer is selected from the group consisting of polyethylene or copolymers thereof, polypropylene or copolymers thereof, thermoplastic polyolefins, thermoplastic elastomers, ethylene propylene terpolymer rubber, polybutylen, styrene or copolymers thereof, thermoplastic polyolefins, polyamide 12, and polyvinylchloride.

19. The composition according to claim 12, wherein the non-polar thermoplastic or elastomeric polymer is selected from the group consisting of polyethylene or copolymers thereof, polypropylene or copolymers thereof, and styrene or copolymers thereof.

20. The composition according to claim 12, wherein an amount of the ionic liquid is from 0.1 to 5% by weight, based on the weight of the polar thermoplastic polymer.

21. The composition according to claim 12, wherein the mixture is from 5 to 25% by weight of the non-polar thermoplastic or elastomeric polymer.

22. The composition according to claim 12, further comprising at least one additional additive selected from the group consisting of light stabilizers, heat stabilizers, processing stabilizers, pigments, fillers, and clarifying agents are incorporated.

* * * * *